United States Patent
Amaral et al.

(10) Patent No.: US 11,308,561 B2
(45) Date of Patent: Apr. 19, 2022

(54) SYSTEM AND METHOD USING THIRD-PARTY DATA TO PROVIDE RISK RELATIONSHIP ADJUSTMENT RECOMMENDATION BASED ON UPCOMING LIFE EVENT

(71) Applicant: Hartford Fire Insurance Company, Hartford, CT (US)

(72) Inventors: Jennifer Maia Amaral, Simsbury, CT (US); Matthew Brown, Cromwell, CT (US); Christopher J Gimpl, Bristol, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 16/722,998

(22) Filed: Dec. 20, 2019

(65) Prior Publication Data
US 2021/0192632 A1 Jun. 24, 2021

(51) Int. Cl.
*G06Q 40/00* (2012.01)
*G06Q 40/08* (2012.01)
*G06Q 10/06* (2012.01)

(52) U.S. Cl.
CPC ......... *G06Q 40/08* (2013.01); *G06Q 10/0635* (2013.01)

(58) Field of Classification Search
USPC .............................. 705/4, 5, 39, 40, 37, 38
See application file for complete search history.

(56) References Cited

U.S. PATENT DOCUMENTS

| | | | |
|---|---|---|---|
| 7,376,618 B1 * | 5/2008 | Anderson | G06Q 20/10 705/38 |
| 7,865,427 B2 * | 1/2011 | Wright | G06Q 20/04 705/38 |

(Continued)

OTHER PUBLICATIONS

E-Risk Management through Self Insurance: An Option Model; 2007 40th Annual Hawaii International Conference on System Sciences (HICSS'07) (p. 158b); Arunabha Mukhopadhyay, Binay Bhushan Chakrabarti, Debashis Saha, Ambuj Mahanti. Jan. 3, 2007. (Year: 2007).*

(Continued)

*Primary Examiner* — Tien C Nguyen
(74) *Attorney, Agent, or Firm* — Buckley, Maschoff & Talwalkar LLC

(57) ABSTRACT

A system to provide a risk relationship life event analytical modeling platform via a back-end application computer server of an enterprise. The system may include a risk relationship data store that contains electronic records representing potential risk relationships between the enterprise and a plurality of entities. Each record may include an electronic record identifier, at least one third-party indication associated with an upcoming life event, and a communication address. The server may determine a selected potential risk relationship and retrieve, from the risk relationship data store, the electronic record associated with the selected potential risk relationship. An analytical model may be executed based on the upcoming life event to generate a risk relationship adjustment recommendation for the selected potential risk relationship. The server may then automatically transmit information about the risk relationship adjustment recommendation to the communication address.

20 Claims, 12 Drawing Sheets

(56) References Cited

U.S. PATENT DOCUMENTS

| | | | |
|---|---|---|---|
| 8,359,211 B2* | 1/2013 | English | H04L 61/2007 |
| | | | 705/4 |
| 8,543,430 B1 | 9/2013 | Fields et al. | |
| 10,346,921 B2* | 7/2019 | Knaust | G06Q 40/08 |
| 10,366,412 B1 | 7/2019 | Ross et al. | |
| 10,692,150 B2* | 6/2020 | Brown | G06Q 50/01 |
| 2009/0326987 A1 | 12/2009 | Roudaut | |
| 2012/0101852 A1 | 4/2012 | Albert | |
| 2014/0229202 A1 | 8/2014 | Bogle et al. | |
| 2017/0124626 A1 | 5/2017 | Barnett et al. | |
| 2019/0164228 A1 | 5/2019 | Ewald et al. | |

OTHER PUBLICATIONS

Insurability of electronic commerce risks; Proceedings of the 35th Annual Hawaii International Conference on System Sciences (p. 9 pp.); T. Grzebiela; Jan. 1, 2002. (Year: 2002).*

* cited by examiner

SYSTEM AND METHOD USING THIRD-PARTY DATA TO PROVIDE RISK RELATIONSHIP ADJUSTMENT RECOMMENDATION BASED ON UPCOMING LIFE EVENT

BACKGROUND

An entity may decide to enter into a risk relationship with an enterprise. For example, an employee might decide to purchase a voluntary group benefit insurance policy (e.g., associated with supplemental life insurance, short term disability insurance, etc.) from an insurer that is offered through his or her employer. Often, such a purchase needs to be made during an "open enrollment" period or within a pre-determined period of time of a "life event" (e.g., a birth, a marriage, a change in employment status, etc.).

When an employee seeks insurance from an insurance company, the insurance company generally requests various information from the employee to determine an appropriate policy for the employee. Such information about an employee is typically stored in the insurance company's database as insurance related data, which includes data that is directly related to various insurance parameters, or factors or criteria, as typically used by an insurance agent for determining the exact terms and conditions of the appropriate insurance policy, coverages, and their limits. However, specific information needed from an employee depends on the kind of insurance that an employee is seeking. This is because each type of insurance coverage is associated with a different set of parameters, or criteria, and specific information about an employee that is related to these parameters is used by an insurance agent to determine the exact terms and conditions of his/her insurance policy.

After obtaining a policy, it is common for a policyholder's parameter data to change due to the occurrence of a significant life event, which may make adjustments to the policy as appropriate. For example, after a policyholder has a child he or she might be interested in increasing the coverage amount of a supplemental life insurance policy. Accordingly, an insurance company or a third-party insurance underwriter may decide to offer such products to an employee after receiving a notification of such a change. Other examples of life events that may trigger changes in parameter data include: getting separated or divorced, having a family member move out (e.g., going to college), moving, changing job(s), and the like. Accordingly, an insurance company may want to receive updated parameter data about policyholders so that the insurance company can determine appropriate policy adjustments, if any, to make sure the policy holders are adequately covered.

An experienced insurance agent can guide a policyholder through various questions targeted to obtain information related to any potential changes in parameter data to determine policy adjustments. Insurance underwriters use updated insurance information about policyholders to verify, accept, alter, or deny insurance adjustments as determined by insurance agents and to determine a monthly insurance premium for the policyholders if an adjusted policy is to be offered. Using an example in which a policyholder has gotten married, an agent might ask if the policyholder's spouse has recently moved in with the policyholder in his/her existing home. If the policyholder has moved, the agent might ask if additional assets were brought in by the spouse to determine if a home owner's insurance policy needs adjustments, e.g., an increase in coverage.

However, such a process may be inefficient and require time and effort by both the insurance agent and the policyholder. Additionally, the process is inconvenient for policyholders who wish to update their insurance policies directly without the involvement of an insurance agent or the insurance company's employee service department.

It would be desirable to provide systems and methods for a risk relationship life event analytical modeling platform that allow faster, more accurate results as compared to traditional approaches.

SUMMARY OF THE INVENTION

According to some embodiments, systems, methods, apparatus, computer program code and means are provided for a risk relationship life event analytical modeling platform that permits faster, more accurate results as compared to traditional approaches and that allows for flexibility and effectiveness when acting on those results. In some embodiments, a system may provide a risk relationship life event analytical modeling platform via a back-end application computer server of an enterprise. The system may include a risk relationship data store that contains electronic records representing potential risk relationships between the enterprise and a plurality of entities. Each record may include an electronic record identifier, at least one third-party indication associated with an upcoming life event, and a communication address. The server may determine a selected potential risk relationship and retrieve, from the risk relationship data store, the electronic record associated with the selected potential risk relationship. An analytical model may be executed based on the upcoming life event to generate a risk relationship adjustment recommendation for the selected potential risk relationship. The server may then automatically transmit information about the risk relationship adjustment recommendation to the communication address.

Some embodiments comprise: means for determining, at the back-end application computer server, a selected potential risk relationship between the enterprise and an entity; means for retrieving, from a risk relationship data store, an electronic record associated with the selected potential risk relationship, including the at least one third-party indication associated with an upcoming life event and a communication address, wherein the risk relationship data store contains electronic records that represent a plurality of potential risk relationships between the enterprise and a plurality of entities, each electronic record including an electronic record identifier, at least one third-party indication associated with an upcoming life event, and a communication address; means for executing an analytical model based on the upcoming life event to generate a risk relationship adjustment recommendation for the selected potential risk relationship; and means for automatically transmitting information about the risk relationship adjustment recommendation to the communication address.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to provide a risk relationship life event analytical modeling platform in a way that provides faster, more accurate results as compared to traditional approaches. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic risk analysis and/or resource allocation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve the analysis of risk, the allocation of resources, and/or the exchange of information, thus improving the overall efficiency of the system associated with message storage requirements and/or bandwidth considerations (e.g., by reducing the number of messages that need to be transmitted via a network). Moreover, embodiments associated with collecting accurate information might further improve risk values, predictions of risk values, allocations of resources, electronic record routing and signal generation, the automatic establishment of communication links, etc.

Figure 1:
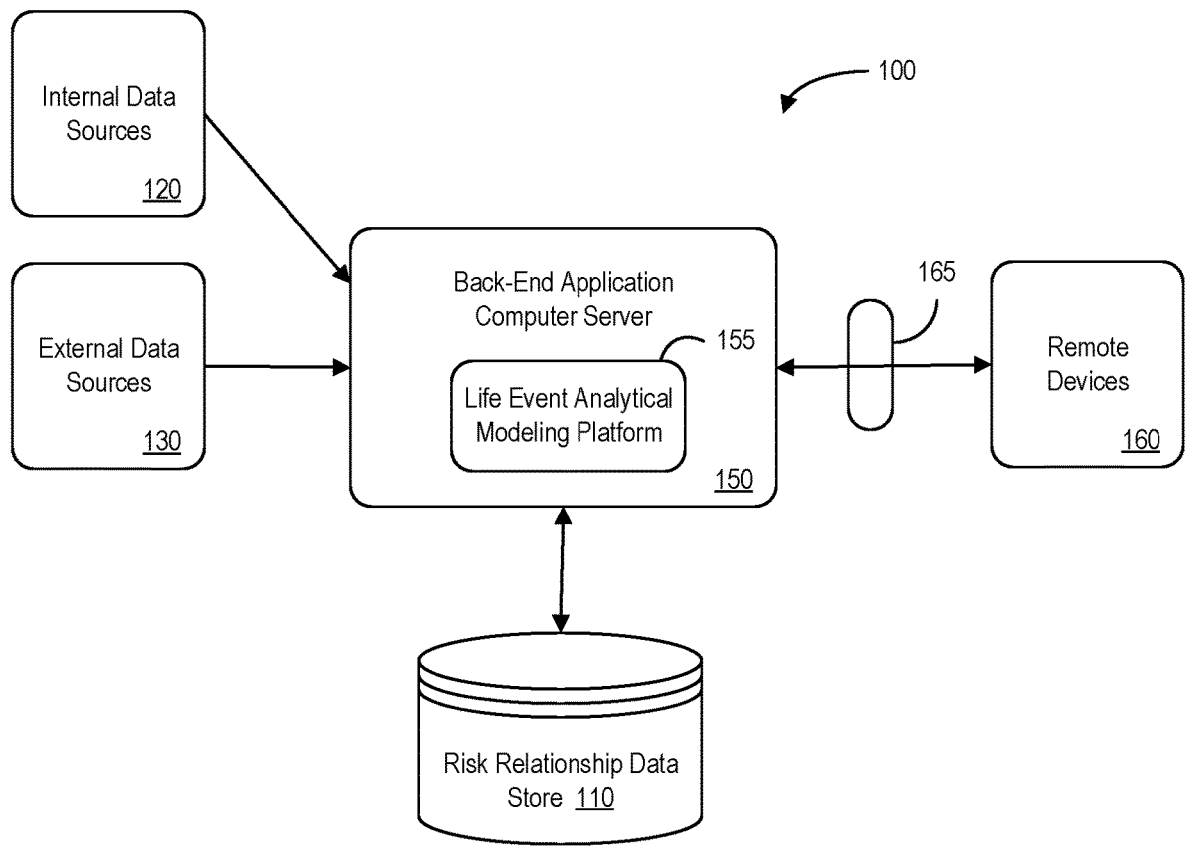
FIG. 1 is a high-level block diagram of a system in accordance with some embodiments.

For example, FIG. 1 is a high-level block diagram of a system 100 according to some embodiments of the present invention. In particular, the system 100 includes a back-end application computer 150 server that may access information in a risk relationship data store 110 (e.g., storing a set of electronic records that represent risk relationships and/or potential risk relationships, each record including, for example, one or more risk relationship identifiers, risk attributes, historical data, communication addresses, etc.). The back-end application computer server 150 may also retrieve information from internal data sources 120 (e.g., internal to an insurance company or an employer system) and/or external data sources 130 (e.g., third-party data) in connection with a life event analytical modeling platform 155. According to some embodiments, the system 100 further applies machine learning, artificial intelligence algorithms, business logic, and/or other models to the electronic records. The back-end application computer server 150 may also exchange information with a remote device 160 (e.g., via communication port 165 that might include a firewall). According to some embodiments, an interactive graphical user interface platform of the back-end application computer server 150 (and, in some cases, third-party data) may facilitate the display of information associated with the life event analytical modeling platform 155 via one or more remote computers (e.g., to enable a manual review of automatically generated communications) and/or the remote device 160. For example, the remote device 160 may receive updated information (e.g., new offer details or educational material) from the back-end application computer server 150. Based on the updated information, a user may review the data from the risk relationship data store 110 and take informed actions in response to communications. Note that the back-end application computer server 150 and/or any of the other devices and methods described herein might be associated with a cloud-based environment and/or a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate communications with remote devices 160 and/or updates of electronic records in the risk relationship data store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the risk relationship data store 110. The risk relationship data store 110 might, for example, store electronic records representing a plurality of risk relationships and/or potential risk relationships, each electronic record having a risk relationship identifier, risk attributes, communication addresses, etc. The risk relationship data store 110 may also contain information about prior and current interactions with entities, including those associated with the remote devices 160. The risk relationship data store 110 may be locally stored or reside remote from the back-end application computer server 150. As will be described further below, the risk relationship data store 110 may be used by the back-end application computer server 150 in connection with an interactive user interface to provide information about the life event analytical modeling platform 155. Although a single back-end application computer server 150 is shown in FIG. 1, any number of such devices may be included. Moreover, various devices described herein might be combined according to embodiments of the present invention. For example, in some embodiments, the back-end application computer server 150 and the risk relationship data store 110 might be co-located and/or may comprise a single apparatus.

Figure 2:
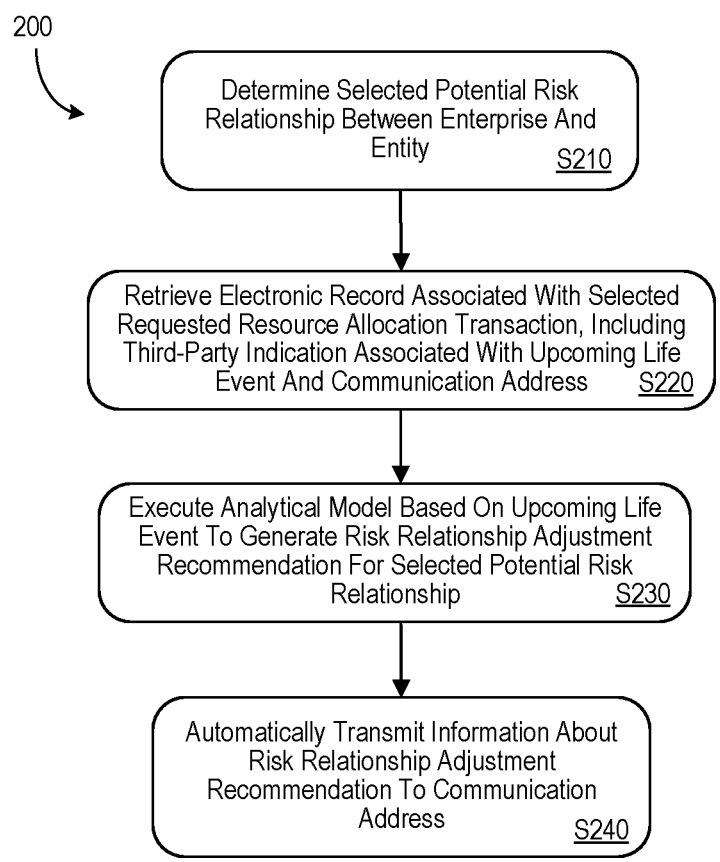
FIG. 2 illustrates a code decision model method according to some embodiments of the present invention.

Note that the system 100 of FIG. 1 is provided only as an example, and embodiments may be associated with additional elements or components. According to some embodiments, the elements of the system 100 automatically transmit communications over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server (e.g., associated with an enterprise) may determine a selected potential risk relationship between the enterprise and an entity. For example, the server might select a relationship that meets certain criteria in accordance with business rules and logic (e.g., all employees of a certain employer between the ages of 20 and 25 years old). The potential risk relationship might be associated with an insurance group benefit offered by an employer (or to members of a trade group or other type of association), supplemental life insurance, Short Term Disability ("STD") insurance, Long Term Disability ("LTD") insurance, purchased time off, voluntary accident insurance, critical illness insurance, hospital indemnity insurance, etc. According to some embodiments, the relationship might be associated with any type of value-added service, such as legal services or financial counseling services.

At S220, the system may retrieve, from a risk relationship data store, an electronic record associated with the selected potential risk relationship. The electronic record may include the at least one third-party indication associated with an upcoming life event (e.g., a birth or moving to a new state) and a communication address (e.g., an email address and telephone number). The risk relationship data store contains electronic records that represent a plurality of potential risk relationships (e.g., voluntary group benefit insurance) between the enterprise and a plurality of entities. As used herein, the phrase "upcoming life event" may refer to a change in status that has not yet occurred, such as a birth, a change in marital status, an address change, a change in employment, an age change, etc. According to some embodiments, the third-party data may based on (or otherwise associated with) employer data, government records, insurance data, a credit score provider, etc.

At S230, the system may execute an analytical model based on the upcoming life event to generate a risk relationship adjustment recommendation (e.g., a suggestion to purchase a particular type of insurance) for the selected potential risk relationship. According to some embodiments, the analytical model further executes based on internal data of the enterprise (e.g., based on information in an insurance company database or an electronic employer storage system). The analytical model might be associated with, for example, employee segmentation, a product mixture based on employee segmentation, a cross-product sales offer, an up-sell product offer, educational material (e.g., explaining a particular type of product or service that is available), etc. Note that the analytical model might utilize a machine learning model created based on historical risk relationship information, a predictive model, supervised or unsupervised learning, reinforcement learning, self-learning, feature learning, etc. Moreover, the model might be associated with sparse dictionary learning, anomaly detection, association rules, an artificial neural network, a decision tree, a Support Vector Machine ("SVM"), a Bayesian network, a genetic algorithm, and/or federated learning.

At S240, the system may automatically transmit information about the risk relationship adjustment recommendation to the communication address. For example, the information might suggest an optimum coverage selection, a cross-sell opportunity, a deductible change, a coverage change, a premium change, etc. The information might be transmitted in accordance with, for example, a postal address, an email address, a telephone number, a text message, a chat interface, a video communication link, etc.

Figure 3:
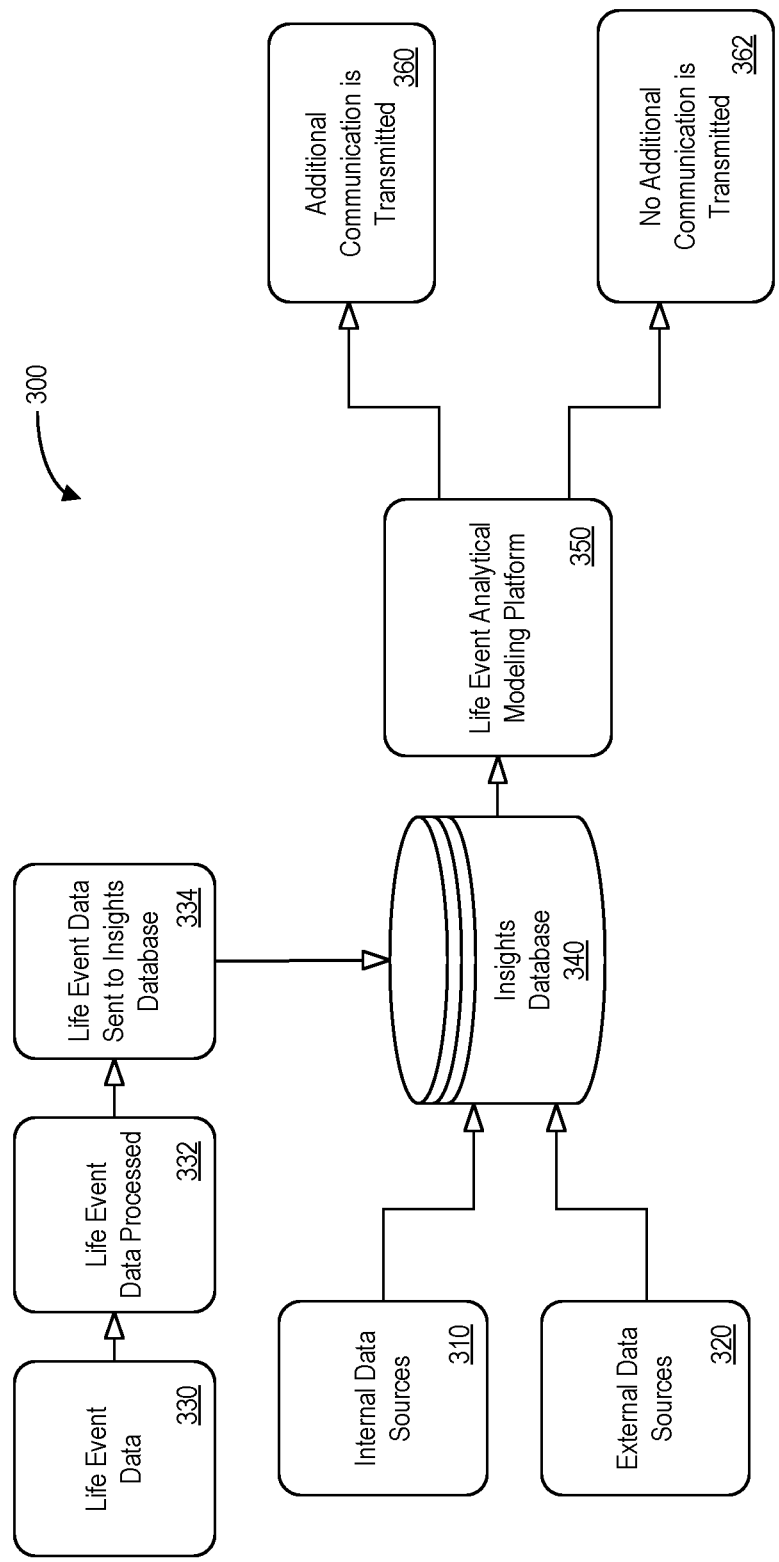
FIG. 3 is a process map in accordance with some embodiments.

FIG. 3 is a process map 300 in accordance with some embodiments. An insights database 340 may receive information from internal data sources 310 (e.g., indicating a marital status and a number of children) and external data sources 320 (e.g., a publicly available government record indicating that a person is moving to a new state). Moreover, life event data 330 may be processed 332 and sent to 334 the insights database 340 for storage. A life event analytical modeling platform 350 may then automatically analyze information in the insights database 340. Based on a result of that analysis, an additional communication may be transmitted at 360 (e.g., if a set of rules indicate that a particular category of upcoming life event is likely to make a certain type of insurance of more interest). If the analysis does not reach such a conclusion, no additional communication is transmitted at 362.

Figure 4:
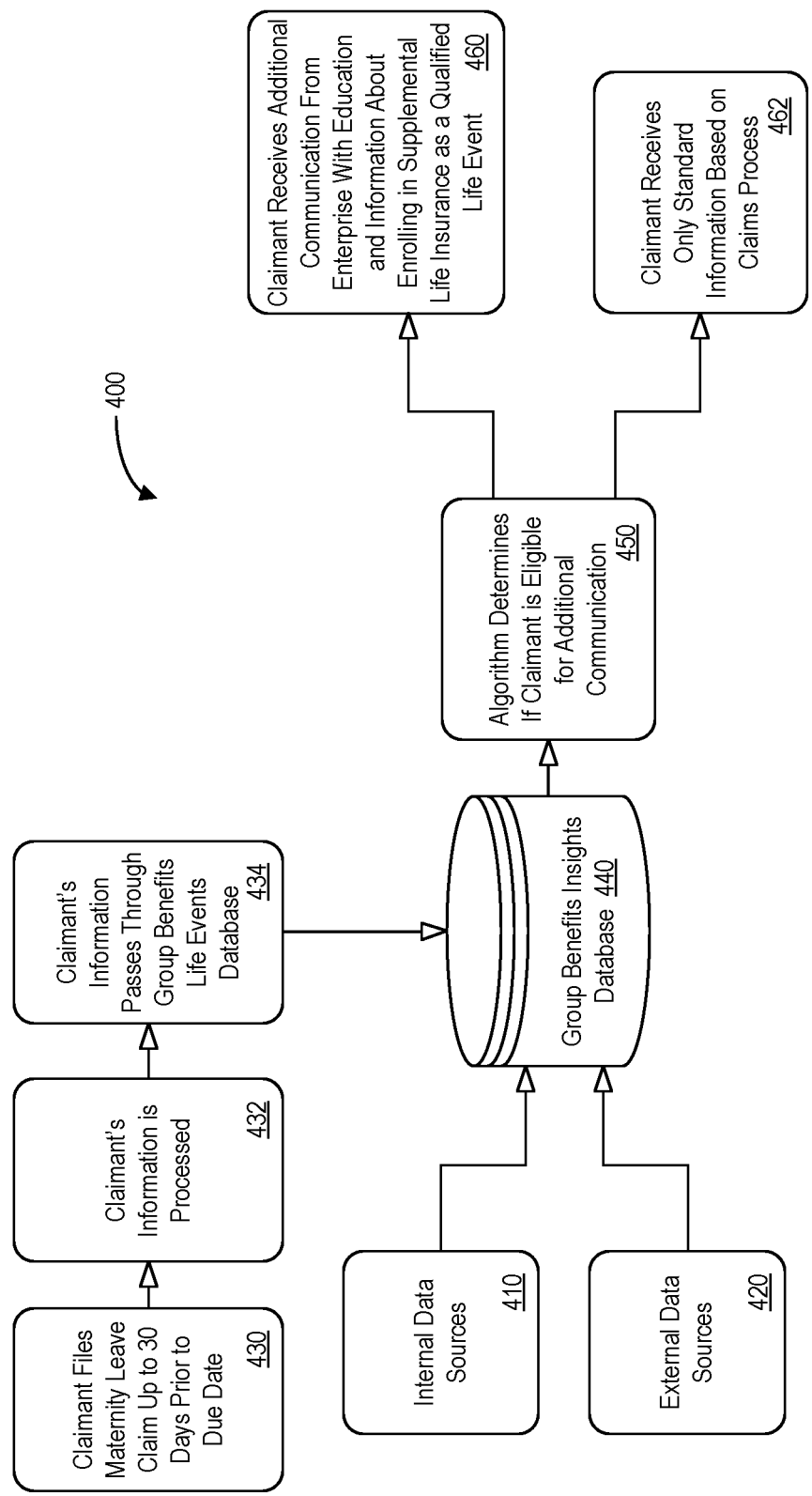
FIG. 4 is an example of a group benefits analysis in view of an upcoming birth according to some embodiments.

More specifically, FIG. 4 is an example 400 of a group benefits analysis in view of an upcoming birth according to some embodiments. As before, a group benefits insights database 440 may receive information from internal data sources 410 (e.g., at an insurance company) and external data sources 420 (e.g., an employer Human Resources ("HR") database). Moreover, life event data indicating that a particular employee has filed for upcoming maternity leave 430 (e.g., 30 days before her due date) may be processed 432 and passed through 434 into the group benefits insights database 440. An algorithm 450 may then automatically access information in the insights database 440 to determine if the claimant is eligible to receive an additional communication. Based on a result of that algorithm, an additional communication may be transmitted to the claimant with education about enrolling in supplemental life insurance at 460. If the algorithm does not reach such a conclusion, the claimant will receive only the standard information based on the maternity leave claims process at 462.

Figure 5:
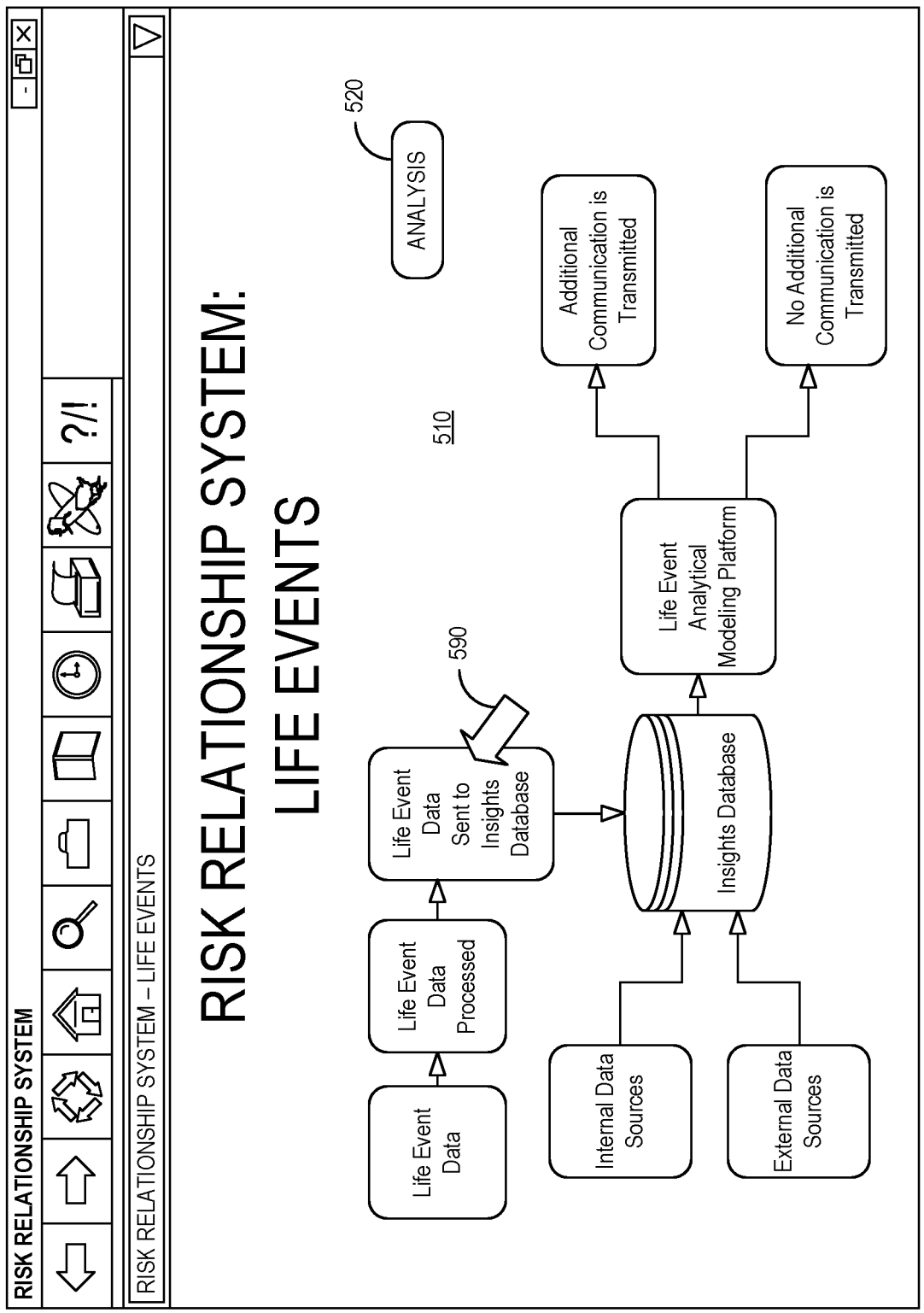
FIG. 5 is an operator or administrator graphical user interface in accordance with some embodiments.

FIG. 5 is an operator or administrator Graphical User Interface ("GUI") display 500 in accordance with some embodiments. The display 500 might provide a graphical depiction 510 of elements of system. According to some embodiments, selection of one of the elements (e.g., via touch screen or a computer mouse pointer 590) might result in a pop-up window providing additional information about that element (e.g., linking to data sources, algorithm parameters, etc.). Moreover, selection of an "Analysis" icon 520 may initiate any of the methods described herein. According to some embodiments, the display 500, along with other displays described herein, may give an operator or administrator a high-level, holistic view that aggregates data from various disparate sources in connection with voluntary group benefits insurance. Such a view may help an enterprise configure and execute the system in a more efficient and accurate manner.

Figure 6:
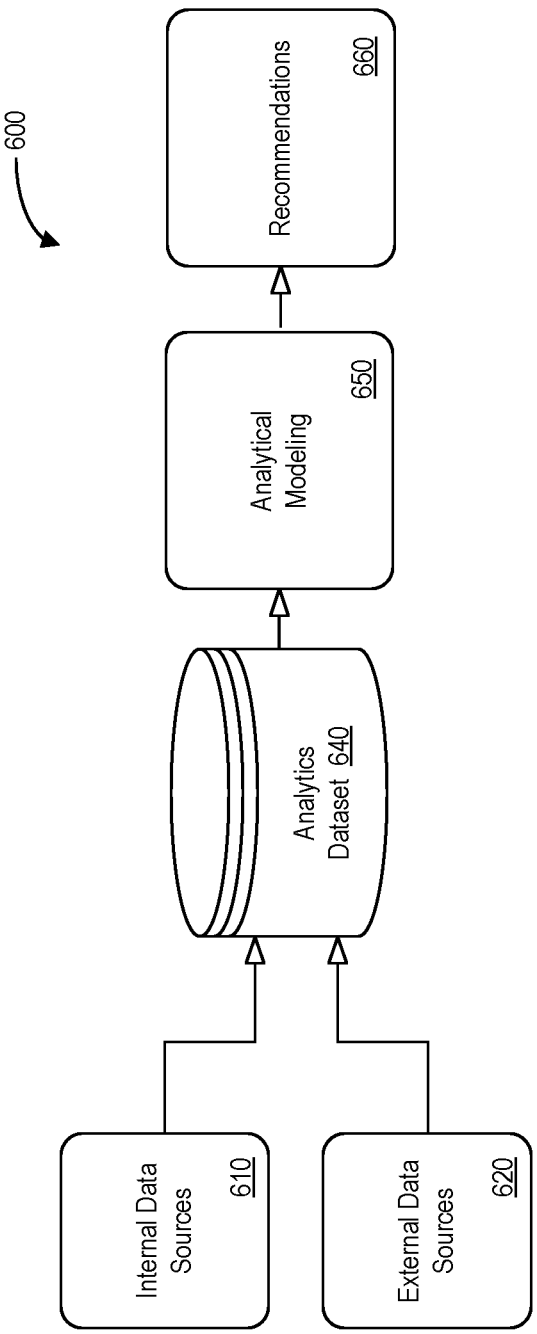
FIG. 6 illustrates an insight system according to some embodiments.

FIG. 6 illustrates an insight system 600 according to some embodiments. The system 600 includes an analysis dataset 640 with information from internal data sources 610 and external data sources 620 that may be used, for example, to identify potential cross-sales opportunities. Analytical modeling 650 may use machine learning and other types of business logic and/or artificial intelligence algorithms to generate recommendations 660 associated with potential risk relationships (e.g., group benefits insurance).

Figure 7:
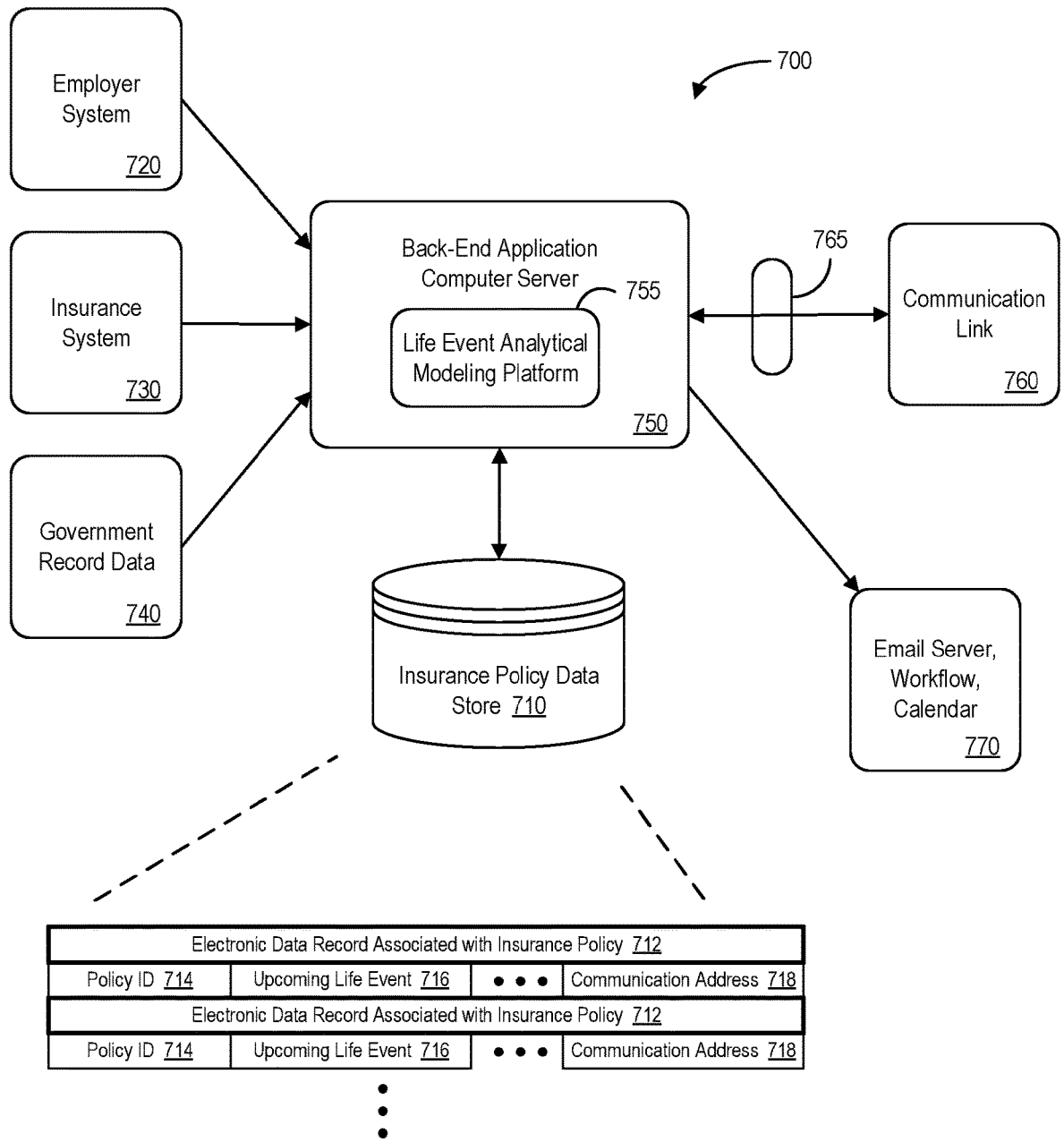
FIG. 7 is a more detailed high-level block diagram of a system in accordance with some embodiments.

FIG. 7 is a more detailed high-level block diagram of a system 700 in accordance with some embodiments. As before, the system 700 includes a back-end application computer 750 server that may access information in an insurance policy data store 710. The back-end application computer server 750 may also retrieve information from an employer system 720, an insurance system 730 and/or government record data 740 in connection with life event analytical modeling platform 755. According to some embodiments, the government record data 740 might be associated with a governmental insurance program (e.g., a list of "healthcare for all" enrollees). Note that various data elements from the insurance policy data store 710, employer system 720, insurance system 730, and/or government record data 740 might be combined, merged, verified, etc. The back-end application computer server 750 may also exchange information via communication links 760 (e.g., via communication port 765 that might include a firewall) to communicate with potential insureds. The back-end application computer server 750 might also transmit information directly to an email server (e.g., to send an insurance offer or educational material), a workflow application, and/or a calendar application 770 (e.g., to schedule a telephone call to discuss an insurance offer or educational material) to facilitate automated communications and/or other actions.

The back-end application computer server 750 may store information into and/or retrieve information from the insurance policy data store 710. The insurance policy data store 710 might, for example, store electronic records 712 representing a plurality of insurance policies, each electronic record having a set of attribute values including an insurance policy identifier 714, an indication of an upcoming life event 716, a communication address 718, etc. According to some embodiments, the system 700 may also provide a dashboard view of insurance offers and/or educational materials (e.g., including acceptance rates, financial results, etc.).

Figure 8:
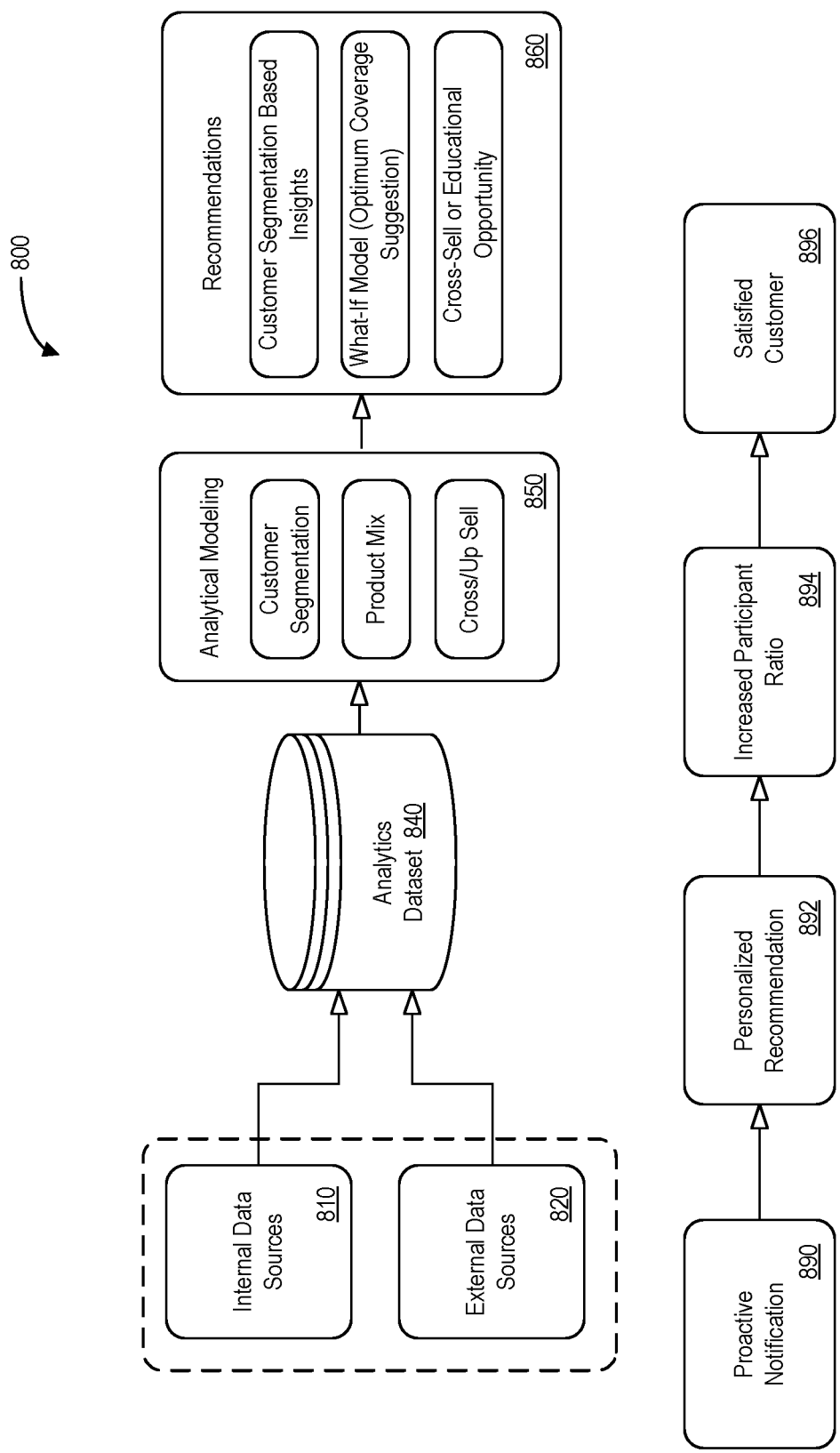
FIG. 8 is a more detailed example of an insight system according to some embodiments.

FIG. 8 is a more detailed example of an insight system 800 according to some embodiments. The system 800 includes an analysis dataset 840 with information from internal data sources 810 and external data sources 820 that may be used, for example, to identify potential cross-sales opportunities and/or potentially appropriate educational materials. Analytical modeling 850 may include customer segmentation, a product mix based on customer segmentation, and/or cross/up sell logic to generate recommendations 860 associated with potential risk relationships (e.g., group benefits insurance). The recommendations 860 might include, for example, customer segmentation-based insights, "what if" model optimization (e.g., a coverage suggestion), cross-sell opportunities, educational materials, etc.

Consider, for example, a female employee named Amy who is 35 years old. She currently has a $75,000 life insurance policy and four family members. Amy applies for a STD claim for a pregnancy. Moreover, Amy may be eligible for supplemental life insurance worth up to four times of her annual salary. During proactive notification 890, the system 800 may, based on the STD claim, identify Amy has an upcoming life event. Moreover, the system 800 may perform a gap analysis of Amy's current product limits and her enrolled benefits. As a result of this analysis, a proactive notification may be transmitted to Amy regarding supplemental life insurance options or plan features. In some embodiments, educational material might be send to Amy to describe or explain how a particular insurance product works.

During personalized recommendation 892, the system 800 may evaluate Amy's risk levels and segmentation information to provide personal recommendations during the renewal phase. The segmentation information might comprise, for example, external data sources associated with a third-party that classifies geographic areas into unique segments based not only on a variety of factors. According to some embodiments, the segments might describe US neighborhoods in easy-to-visualize terms, such as "Soccer Moms" or "Heartland Communities." Assume for this example, that 70% of people in Amy's "Family Landscape" have supplemental life insurance coverage as an added benefit.

During increased participant ratio 894, the enterprise may recognize that this represents an opportunity to increase participant contribution and cross/up sell relevant products. As a result of this process, a satisfied customer 896 may experience enhanced employee satisfaction because the enterprise is able to personalize offerings and acknowledge Amy's evolving needs. Note that by making such an offer before the life event occurs, Amy may be more easily able to consider the offer and make a decision (as opposed to after the baby is born when it might be more difficult to focus on issues connected to insurance).

Figure 9:
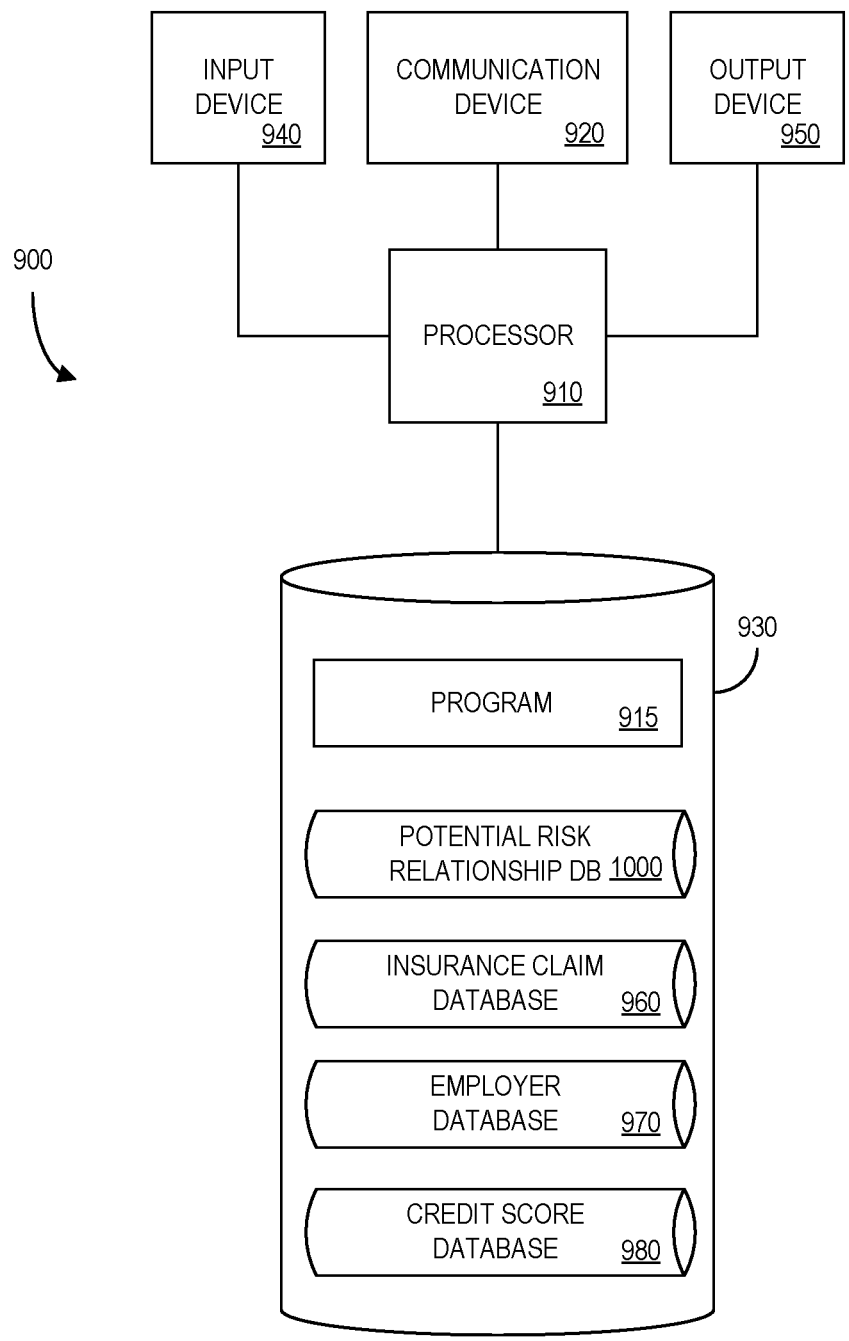
FIG. 9 is a block diagram of an apparatus in accordance with some embodiments of the present invention.

The embodiments described herein may be implemented using any number of different hardware configurations. For example, FIG. 9 illustrates an apparatus 900 that may be, for example, associated with the systems 100, 700 described with respect to FIGS. 1 and 7, respectively. The apparatus 900 comprises a processor 910, such as one or more commercially available Central Processing Units ("CPUs") in the form of one-chip microprocessors, coupled to a communication device 920 configured to communicate via communication network (not shown in FIG. 9). The communication device 920 may be used to communicate, for example, with one or more remote administrator computers and or communication devices (e.g., PCs and smartphones). Note that communications exchanged via the communication device 920 may utilize security features, such as those between a public internet user and an internal network of the insurance enterprise. The security features might be associated with, for example, web servers, firewalls, and/or PCI infrastructure. The apparatus 900 further includes an input device 940 (e.g., a mouse and/or keyboard to enter information about employee segments, life event rules and logic, etc.) and an output device 950 (e.g., to output reports regarding insurance offer status).

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 915 and/or a resource allocation tool or application for controlling the processor 910. The processor 910 performs instructions of the program 915, and thereby operates in accordance with any of the embodiments described herein. For example, the processor 910 may provide a risk relationship life event analytical modeling platform via a back-end application computer server of an enterprise. The processor 910 may determine a selected potential risk relationship and retrieve, from a risk relationship data store, the electronic record associated with the selected potential risk relationship (including an indication of an upcoming life event for an employee along with his or her communication address). An analytical model may be executed by the processor 910 based on the upcoming life event to generate a risk relationship adjustment recommendation for the selected potential risk relationship. The processor 910 may then automatically transmit information about the risk relationship adjustment recommendation to the communication address.

The program 915 may be stored in a compressed, uncompiled and/or encrypted format. The program 915 may furthermore include other program elements, such as an operating system, a database management system, and/or device drivers used by the processor 910 to interface with peripheral devices.

As used herein, information may be "received" by or "transmitted" to, for example: (i) the back-end application computer server 900 from another device; or (ii) a software application or module within the back-end application computer server 900 from another software application, module, or any other source.

In some embodiments (such as shown in FIG. 9), the storage device 930 further stores a potential risk relationship database 1000 (e.g., containing insurance policy information), an insurance claim database 960, an employer database 970, and a credit score database 980. An example of a database that might be used in connection with the apparatus 900 will now be described in detail with respect to FIG. 10. Note that the database described herein is only an example, and additional and/or different information may be stored therein. Moreover, various databases might be split or combined in accordance with any of the embodiments described herein. For example, the potential risk relationship database 1000 and the insurance claim database 1000 might be combined and/or linked to each other within the program 915.

Figure 10:
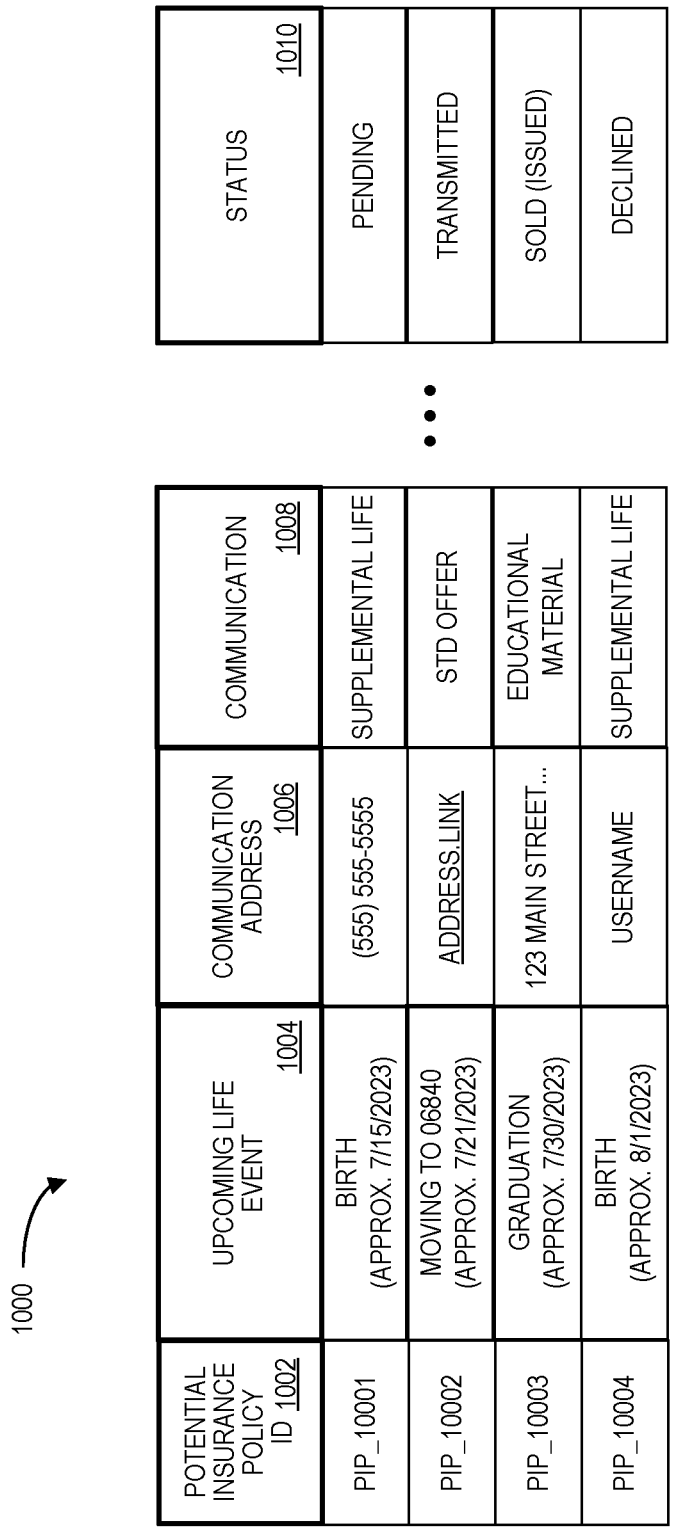
FIG. 10 is a portion of a tabular insurance claim database according to some embodiments.

Referring to FIG. 10, a table is shown that represents the potential risk relationship database 1000 that may be stored at the apparatus 900 according to some embodiments. The table may include, for example, entries associated with potential up-sell opportunities. The table may also define fields 1002, 1004, 1006, 1008, 1010 for each of the entries. The fields 1002, 1004, 1006, 1008, 1010 may, according to some embodiments, specify: an potential insurance policy identifier 1002, an upcoming life event 1004, a communication address 1006, a communication 1008, and a status 1010. The potential risk relationship database 1000 may be created and updated, for example, based on information electrically received from various operators, administrators, and computer systems (e.g., including an insight algorithm), such as those associated with an insurer.

The potential insurance policy identifier 1002 may be, for example, a unique alphanumeric code identifying a voluntary group benefits insurance up-sell or cross-sell opportunity. The upcoming life event 1004 might describe the change in status that is expected to occur (e.g., a birth or graduation) along with an estimate time associated with that change. The communication address 1006 might be postal address, telephone number, communication link, etc. that can be used to transmit information about a recommendation. The communication 1008 might describe the type of up-sell, cross-sell, or educational material that have been created in view of the upcoming life event 1004. The status 1010 might indicate that the communication 1008 is pending, has been transmitted, has been accepted (e.g. the insurance policy has been sold), declined, etc. The status 1010 might, according to some embodiments, might be used as feedback to update a predictive algorithm to improve performance over time.

Thus, embodiments may provide an automated and efficient way for a risk relationship life event analytical modeling platform to allow for faster, more accurate results as compared to traditional approaches. Embodiments may improve participant ratio by tapping into qualified life events and historical claim patterns to provide personalized product suggestions for cross-sell/up-sell and/or educational materials. Some embodiments may comprise an integrated data asset that stores, tags, and analyzes individual participant-level information that creates cross-sell/up-sell insights covering employer, eligibility, coverage, and/or claims information to drive education, growth, and employee participation or retention. Such a system may support premium growth, increase participation ratio, improved beneficiary experience through contextual messaging and relevancy of product recommendations, and/or allow for improved case-level persistency.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., professional liability insurance policies, extreme weather insurance policies, etc.). Similarly, although certain attributes (e.g., values analyzed in connection with resource allocation requests) were described in connection some embodiments herein, other types of attributes might be used instead. In addition, embodiments have been described in connection with an "upcoming" life event. Note, however, that embodiments might be associated with life events that recently occurred (e.g., within the last 30 days). This might, for example, provide an enterprise with time to determine that a recent life event has taken place (e.g., a marriage license might become publicly available a short time after it is issued).

Figure 11:
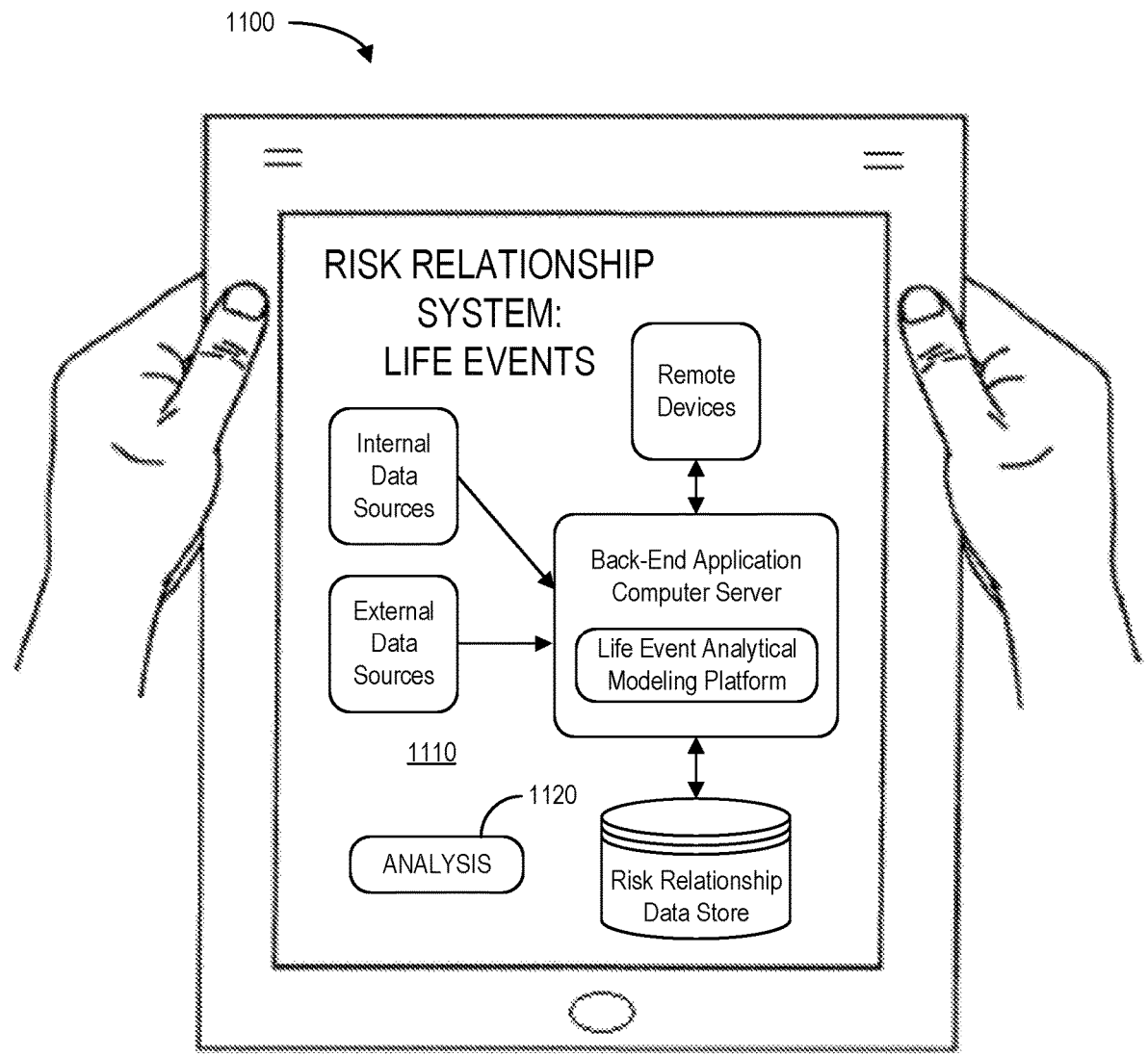
FIG. 11 illustrates a tablet computer displaying a risk relationship life event analytical modeling platform user interface according to some embodiments.

Further, the displays and devices illustrated herein are only provided as examples, and embodiments may be associated with any other types of user interfaces. For example, FIG. 11 illustrates a handheld tablet computer 1100 showing a risk relationship life event analytical modeling platform display 1110 according to some embodiments. The life event display 1110 might include user-selectable data that can be highlighted and/or modified by a user of the handheld computer 1110 to provide information about potential risk relationship recommendations. Moreover, selection of an "Analysis" icon 1120 may initiate performance of any of the methods described herein.

Note that the displays described herein might be constantly updated based on new information (e.g., as data is received by the insurer). For example, the displays might be updated in substantially real time or on a periodic basis (e.g., once each night). According to some embodiments, a claim handler might be able to select a particular time in the past and the displays may be updated to reflect the information as it previously existed at that particular time (e.g., what would an operator or administrator have seen one year ago?).

Figure 12:
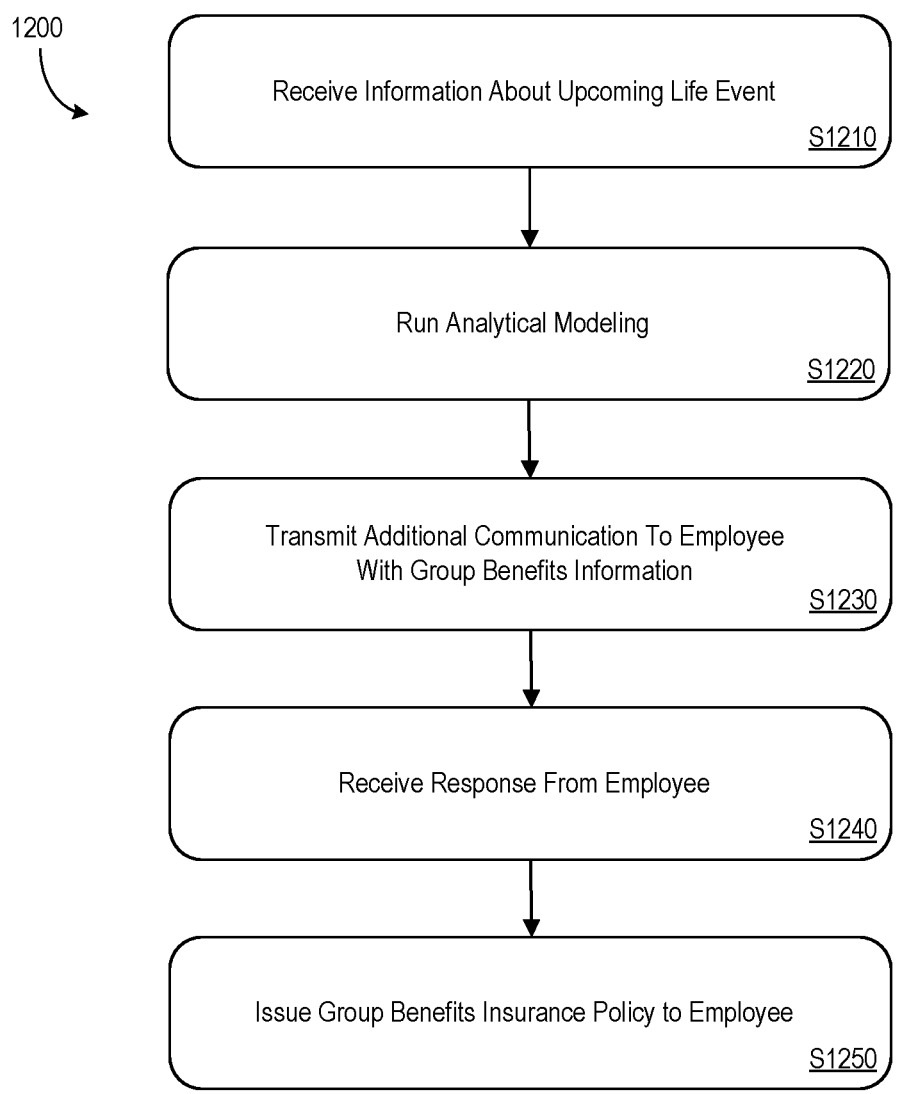
FIG. 12 illustrates an overall process in accordance with some embodiments.

FIG. 12 illustrates an overall business process 1200 in accordance with some embodiments. At S1210, an insurer may receive information about an upcoming life event (e.g., an employee may have schedule a paternity leave). At S1220, the system may run analytical modeling in view of the upcoming life event to generate a group benefits insurance recommendation. At S1230, an additional communication may be transmitted to the employee with information about the group benefits insurance recommendation. As response may be received from the employee at S1240 and a group benefits insurance policy may be issued to the employee at S1250.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to provide a risk relationship life event analytical modeling platform via a back-end application computer server of an enterprise, comprising:
   (a) a risk relationship data store containing electronic records that represent a plurality of potential risk relationships between the enterprise and a plurality of entities, wherein each electronic record includes an electronic record identifier, at least one third-party indication associated with an upcoming life event, and a communication address;
   (b) the back-end application computer server, coupled to the risk relationship data store, including:
      a computer processor, and
      a computer memory, coupled to the computer processor, storing instructions that, when executed by the computer processor, cause the back-end application computer server to:
         (i) determine a selected potential risk relationship between the enterprise and an entity,
         (ii) retrieve, from the risk relationship data store, the electronic record associated with the selected potential risk relationship, including the at least one third-party indication associated with an upcoming life event and a communication address,
         (iii) execute an analytical model based on the upcoming life event to generate a risk relationship adjustment recommendation for the selected potential risk relationship,
         (iv) determine an eligibility of the selected potential risk relationship to receive an additional communication about the risk relationship adjustment recommendation,
         (v) when it is determined the selected risk relationship is not eligible to receive the additional communication, automatically transmit standard information to the communication address while avoiding the transmission of the additional communication about the risk relationship adjustment recommendation thereby reducing electronic message traffic in a distributed communication network, and
         (vi) when it is determined the selected risk relationship is eligible to receive the additional communication, automatically transmit the standard information along with the additional communication including information about the risk relationship adjustment recommendation to the communication address;
   and
   (c) a communication port coupled to the back-end application computer server to facilitate a transmission of data with a remote device to support a graphical interactive user interface display via the distributed communication network, the interactive user interface display providing potential resource allocation data including the risk relationship adjustment recommendation.

2. The system of claim 1, wherein the analytical model further executes based on internal data of the enterprise.

3. The system of claim 2, wherein the analytical model is associated with at least one of: (I) employee segmentation, (ii) a product mixture based on employee segmentation, (iii) a cross-product sales offer, (iv) an up-sell product offer, (v) educational material.

4. The system of claim 2, wherein the analytical model is associated with at least one of: (i) a machine learning model created based on historical risk relationship information, (ii) a predictive model, (iii) supervised learning, (iv) unsupervised learning, (v) reinforcement learning, (vi) self-learning, (vii) feature learning, (viii) sparse dictionary learning, (ix) anomaly detection, (x) association rules, (xi) an artificial neural network, (xii) a decision tree, (xiii) a support vector machine, (xiv) a Bayesian network, (xv) a genetic algorithm, and (xvi) federated learning.

5. The system of claim 1, wherein the upcoming life event is associated with at least one of: (i) a birth, (ii) a change in marital status, (iii) an address change, (iv) a change in employment, and (v) an age change.

6. The system of claim 5, wherein the third-party data is associated with at least one of: (i) employer data, (ii) government records, (iii) insurance data, and (iv) a credit score provider.

7. The system of claim 1, wherein the risk relationship adjustment recommendation is associated with at least one of: (i) an optimum coverage selection, (ii) a cross-sell opportunity, (iii) a deductible change, (iv) a coverage change, and (v) a premium change.

8. The system of claim 1, wherein the communication address is associated with at least one of: (i) a postal address, (ii) an email address, (iii) a telephone number, (iv) a text message, (v) a chat interface, and (vi) a video communication link.

9. The system of claim 1, wherein the potential risk relationship is associated with at least one of: (i) an insurance group benefit offered by an employer, (ii) supplemental life insurance, (iii) short term disability insurance, (iv) long term disability insurance, (v) purchased time off, (vi) voluntary accident insurance, (vii) critical illness insurance, (viii) hospital indemnity insurance, (ix) a value added service, (x) legal services, and (xi) financial counseling services.

10. A computerized method to provide a risk relationship life event analytical modeling platform via a back-end application computer server of an enterprise, comprising:
   determining, at a computer processor of the back-end application computer server, a selected potential risk relationship between the enterprise and an entity;
   retrieving, from a risk relationship data store, an electronic record associated with the selected potential risk relationship, including at least one third-party indication associated with an upcoming life event and a communication address, wherein the risk relationship data store contains electronic records that represent a plurality of potential risk relationships between the enterprise and a plurality of entities, each electronic record including an electronic record identifier, the at least one third-party indication associated with an upcoming life event, and a communication address;
   executing an analytical model based on the upcoming life event to generate a risk relationship adjustment recommendation for the selected potential risk relationship;
   determining an eligibility of the selected potential risk relationship to receive an additional communication about the risk relationship adjustment recommendation;
   when the selected risk relationship is not eligible to receive the additional communication, automatically transmitting standard information to the communication address while avoiding the transmission of the additional communication about the risk relationship adjustment recommendation thereby reducing electronic message traffic in a distributed communication network; and
   when the selected risk relationship is eligible to receive the additional communication, automatically transmitting the standard information along with the additional communication including information about the risk relationship adjustment recommendation to the communication address.

11. The method of claim 10, wherein the analytical model further executes based on internal data of the enterprise.

12. The method of claim 11, wherein the analytical model is associated with at least one of: (i) employee segmentation, (ii) a product mixture based on employee segmentation, (iii) a cross-product sales offer, (iv) an up-sell product offer, and (v) educational material.

13. The method of claim 11, wherein the analytical model is associated with at least one of: (i) a machine learning model created based on historical risk relationship information, (ii) a predictive model, (iii) supervised learning, (iv) unsupervised learning, (v) reinforcement learning, (vi) self-learning, (vii) feature learning, (viii) sparse dictionary learning, (ix) anomaly detection, (x) association rules, (xi) an artificial neural network, (xii) a decision tree, (xiii) a support vector machine, (xiv) a Bayesian network, (xv) a genetic algorithm, and (xvi) federated learning.

14. The method of claim 10, wherein the upcoming life event is associated with at least one of: (i) a birth, (ii) a change in marital status, (iii) an address change, (iv) a change in employment, and (v) an age change.

15. The method of claim 14, wherein the third-party data is associated with at least one of: (i) employer data, (ii) government records, (iii) insurance data, and (iv) a credit score provider.

16. A non-tangible, computer-readable medium storing instructions, that, when executed by a processor, cause the processor to perform a method to provide a risk relationship life event analytical modeling platform via a back-end application computer server of an enterprise, the method comprising:
   determining, at a computer processor of the back-end application computer server, a selected potential risk relationship between the enterprise and an entity;
   retrieving, from a risk relationship data store, an electronic record associated with the selected potential risk relationship, including the at least one third-party indication associated with an upcoming life event and a communication address, wherein the risk relationship data store contains electronic records that represent a plurality of potential risk relationships between the enterprise and a plurality of entities, each electronic record including an electronic record identifier, at least one third-party indication associated with an upcoming life event, and a communication address;
   executing an analytical model based on the upcoming life event to generate a risk relationship adjustment recommendation for the selected potential risk relationship;
   determining an eligibility of the selected potential risk relationship to receive an additional communication about the risk relationship adjustment recommendation;
   when the selected risk relationship is not eligible to receive the additional communication, automatically transmitting standard information to the communication address while avoiding the transmission of the additional communication about the risk relationship adjustment recommendation thereby reducing electronic message traffic in a distributed communication network; and
   when the selected risk relationship is eligible to receive the additional communication, automatically transmitting the standard information along with the additional communication including information about the risk relationship adjustment recommendation to the communication address.

17. The medium of claim 16, wherein the analytical model further executes based on internal data of the enterprise.

18. The medium of claim 16, wherein the risk relationship adjustment recommendation is associated with at least one of: (i) an optimum coverage selection, (ii) a cross-sell opportunity, (iii) a deductible change, (iv) a coverage change, and (v) a premium change.

19. The medium of claim 16, wherein the communication address is associated with at least one of: (i) a postal address, (ii) an email address, (iii) a telephone number, (iv) a text message, (v) a chat interface, and (vi) a video communication link.

20. The medium of claim 16, wherein the potential risk relationship is associated with at least one of: (i) an insurance group benefit offered by an employer, (ii) supplemental life insurance, (iii) short term disability insurance, (iv) long term disability insurance, (v) purchased time off, (vi) voluntary accident insurance, (vii) critical illness insurance, (viii) hospital indemnity insurance, (ix) a value added service, (x) legal services, and (xi) financial counseling services.

\* \* \* \* \*